United States Patent
Chapman et al.

(10) Patent No.: US 6,361,922 B1
(45) Date of Patent: Mar. 26, 2002

(54) THICKER OPTICAL RECORDING LAYERS COMPRISING A TETRA DYE HAVING A METALLIZED AZO DIANIONIC DYE WITH CATIONIC DYE COUNTERIONS

(75) Inventors: Derek David Chapman, Rochester; James C. Fleming; Ramanuj Goswami, both of Webster; Csaba Andras Kovacs, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 662 days.

(21) Appl. No.: 08/734,431

(22) Filed: Oct. 16, 1996

(51) Int. Cl.[7] .............................. G11B 7/27; G03C 1/72
(52) U.S. Cl. ............. 430/270.19; 430/945; 430/270.21; 369/283; 369/284; 369/288
(58) Field of Search ........................... 430/945, 270.16, 430/270.19, 270.21, 270.2; 364/283, 284, 288

(56) References Cited

U.S. PATENT DOCUMENTS

| | | | | |
|---|---|---|---|---|
| 4,577,306 A | * | 3/1986 | Howe et al. ................. 369/109 |
| 4,735,889 A | * | 4/1988 | Namba et al. ......... 430/270.19 |
| 5,272,047 A | * | 12/1993 | Kovacs et al. ......... 430/270.16 |
| 5,294,471 A | | 3/1994 | Evans et al. ................. 430/945 |
| 5,426,015 A | * | 6/1995 | Chapman et al. ...... 430/270.21 |
| 5,500,325 A | | 3/1996 | Chapman et al. ...... 430/270.16 |
| 5,547,727 A | * | 8/1996 | Shuttleworth et al. . 430/270.14 |

OTHER PUBLICATIONS

US Ser. No. 08/557,252, filed Nov. 14, 1995, of Burns et al., entitled "Optical Recording Elements Having Recording Layers Exhibiting Reduced Bubble Formation".

Skoog, Douglas Arvid, "Principles of Instrumental Analysis" ©1980 pp. 151–152.*

\* cited by examiner

Primary Examiner—Martin Angebranndt
(74) Attorney, Agent, or Firm—John R. Everett; J. Jeffrey Hawley

(57) ABSTRACT

The present invention discloses optical recording elements having optical recording layers containing tetra dyes. The dyes have metallized azo dianionic dye with cationic dye counterions. The recording layer has a thickness from 225 to 300 nm.

4 Claims, 1 Drawing Sheet

THICKER OPTICAL RECORDING LAYERS COMPRISING A TETRA DYE HAVING A METALLIZED AZO DIANIONIC DYE WITH CATIONIC DYE COUNTERIONS

FIELD OF THE INVENTION

The present invention relates to optical recording elements, including recordable optical elements.

BACKGROUND OF THE INVENTION

There are many types of known optical recording elements. In many of the elements, the mode of operation requires a recording layer having a high absorption and the recorded marks, often referred to as pits, have low optical density or high reflectivity. The high reflectivity pits are made by ablating away the high absorption recording material, usually exposing an underlying reflective layer.

One of the currently popular forms of optical storage of information is the compact disk or CD. Digital information is stored in the form of high optical density marks or pits on an otherwise reflective background, as read with a focused laser diode operating in the 780–835 nm spectral region. This is the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording elements which, when recorded in real time, produce a record that mimics the conventional CD on read out by generating dark marks on a reflective background.

One recently disclosed system of this type is the so called "Photo CD". In this system, conventional photographic film is first processed in a conventional manner. Then, the images from the film are scanned and digitized. The digitized information is recorded in a CD readable form on an optical recording element. Images can then be played back on a CD type player into a conventional television.

Commercially useful materials of the type described in these references have stringent requirements. The recording layer must be able to couple with incident write laser irradiation to provide features having sufficient contrast. At the same time the unmarked portion of the disk must have sufficient reflectivity to conform to the 70% CD-ROM standard (ISO/IEC 10149). The layer must also have good stability towards light, heat and humidity for acceptable shelf life. Photo CD, for example, is a consumer product and it must be capable of withstanding extreme environments. Between the time the original images are recorded on the Photo CD and the time subsequent images are recorded, the CD might be placed in strong sunlight.

Thus, there is a continuing need for optical recording materials that have the necessary optical characteristics so that they are CD compatible, can couple with incident laser irradiation to form features with sufficient contrast, meet the minimum reflectivity standard, and yet are light stable. It is to a solution to this problem that the present invention is directed.

U.S. Pat. No. 5,426,015 discloses optical recording elements having recording layers containing tetra dyes. These dyes comprise metallized azodianions with cationic dye counterions. These elements exhibit sensitivity that could be improved.

BRIEF DESCRIPTION OF FIGURES

Both

SUMMARY OF THE INVENTION

Figure 1:
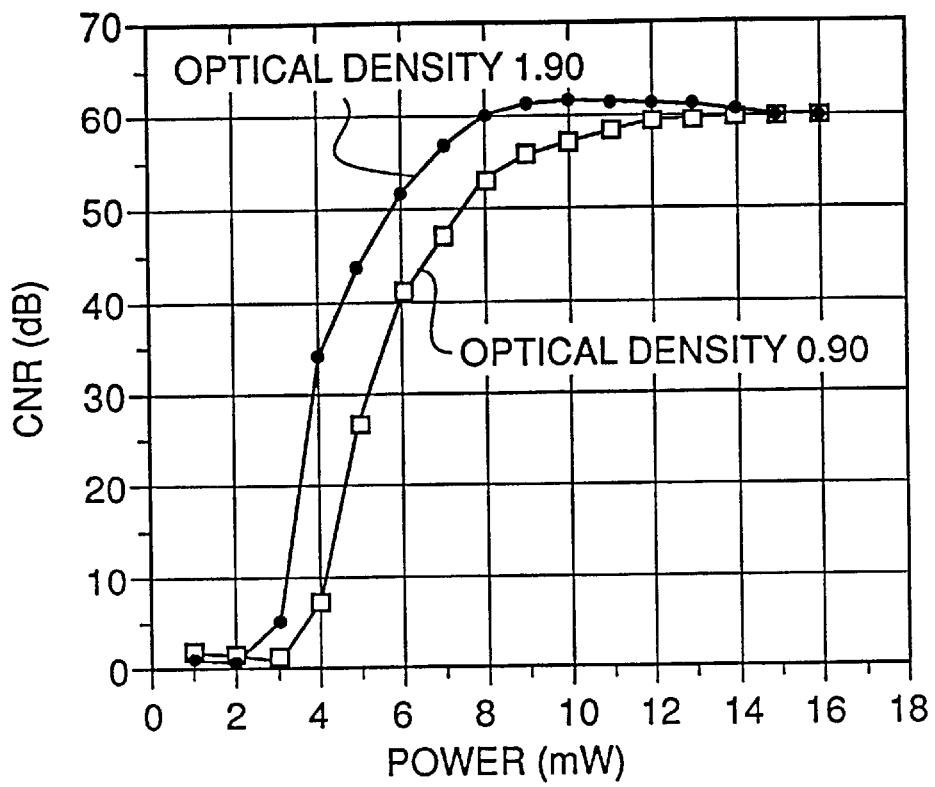
FIGS. 1 and 2 illustrate the greater sensitivity of the recording elements of the invention compared to the prior art.

The present invention provides an optical recording element having a transparent substrate and on the surface of said substrate, a recording layer and a light reflecting layer wherein (a) the unrecorded layer is such that the real part of the refractive index (n) at 780 nm, is not less than 1.8, and the imaginary part (k) is not greater than 0.15 and (b) the recording layer comprises one or more tetra dyes having a metallized azo dianion and cationic dye counterions and (c) a recording layer thickness from 225 to 300 nanometers.

The tetra dyes, including mixtures of such dyes, together with thicker recording layers provide improved laser recording sensitivity and superior recording layer performance. Sensitivity is measured by the carrier-to-noise ratio (CNR) at a given power or by the power required to attain a given CNR value.

DETAILS OF THE INVENTION

We have found that recording layer thicknesses prescribed by this invention provide improved sensitivity. The recording process in CD writable element is very complex, we believe that the dye chromaphore is destroyed during the extreme temperatures reached upon laser exposure. We also have microscopic evidence that gases are released and bubbles may form, particularly in thicker dye layers. However, it is not obvious why thick films should show enhanced sensitivity. Indeed, the absorption of thick films is greater, and more light is coupled into the layer, but the amount of material to be altered during recording is increased proportionately. One possible explanation for the enhanced sensitivity is that a greater portion of the reactive layer is removed from the thermally conductive gold layer, allowing for more effective use of the available thermal energy in dye bleaching or gas formation.

The tetra dyes used in the invention form the light absorbing layer in mixtures with other dyes and/or other addenda. Useful tetra dyes have the general structure I:

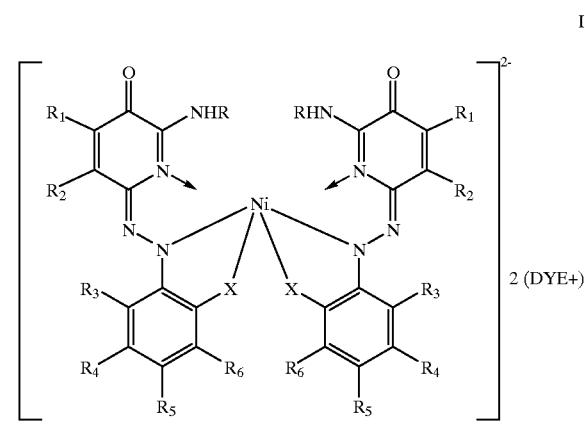

R represents hydrogen, alkyl having 1 to 20 carbons, aryl having 6 to 10 carbon atoms;

$R_1$ represents hydrogen or alkyl having 1 to 6 carbon atoms;

$R_2$ represents a hydrogen, alkyl having 1 to 5 carbon atoms, $SO_2R_7$ or $SO_2NHR_7$ where $R_7$ is alkyl having 1 to 10 carbon atoms, aryl having 6 to 10 carbon atoms hetaryl having 5 to 10 carbon atoms or halogen;

$R_3$ represents hydrogen, alkyl having 1 to 4 carbon atoms or halogen.

$R_4$ represents hydrogen, halogen, alkyl having 1 to 10 carbons, $SO_2R_7$ or $SO_2NHR_7$;

$R_5$ represents an electron withdrawing group such as CN, $SO_2R_8$, $SO_2NR_9R_{10}$ where $R_8$, $R_9$ or $R_{10}$ each independently represents hydrogen, alkyl group from 1 to 5 carbons; aryl having 6 to 10 carbon atoms; hetaryl, having 5 to 10 carbons, cycloalkyl having 5 to 7 carbons;

$R_6$ represents hydrogen; alkyl having 1 to 5 carbons or halogen;,

X represents oxygen, carboxyl or sulfo; and

Dye+ can be any dye that has one or more positive charges.

The tetra dyes are prepared with known procedures and materials described in U.S. Pat. No. 5,426,015.

The following tetra dyes are representative of the dyes used in this invention. The dianionic structures can be selected from Table 1 and the cationic dye structures can be selected from Table 2.

TABLE 1

[Anionic Ni Azo Structure]$^{2-}$

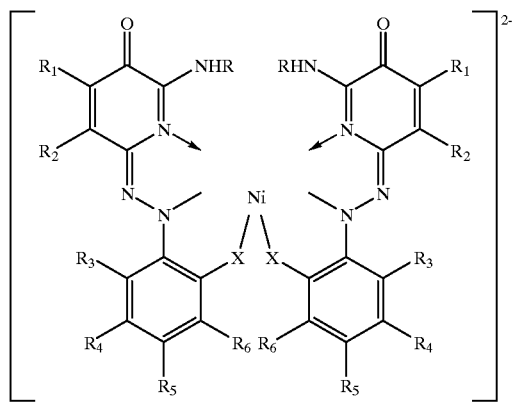

| Dianion Ni Complex | R | $R_1$ | $R_2$ | $R_3$ | $R_4$ | $R_5$ | $R_6$ | X |
|---|---|---|---|---|---|---|---|---|
| A | H | H | H | H | Cl | $CH_3SO_2$ | H | O |
| B | H | H | Br | H | H | $CH_3SO_2$ | H | O |
| C | H | H | $CH_3SO_2$ | H | Cl | $CH_3SO_2$ | H | O |
| D | H | H | $CH_3SO_2$ | H | Cl | $(CH_3)_3CHNSO_2$ | H | O |
| E | H | $CH_3$ | $CH_3SO_2$ | H | Cl | $CH_3SO_2$ | H | O |
| F | H | $CH_3$ | $CH_3SO_2$ | H | H | $NO_2$ | H | $SO_3$ |
| G | H | H | $CH_3SO_2$ | H | H | $CH_3SO_2$ | H | O |
| H | H | H | H | H | H | $CH_3SO_2$ | H | O |

TABLE 2

Cationic Structures

| No. | Cationic Structures |
|---|---|
| 1 | 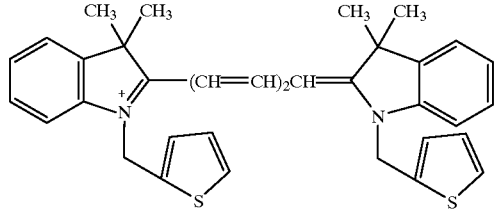 |
| 2 | 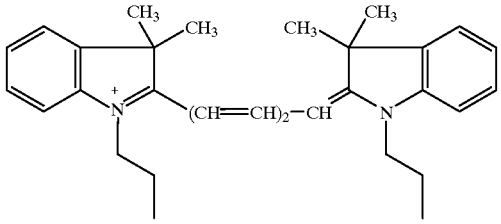 |

TABLE 2-continued

Cationic Structures

| No. | Cationic Structures |
|---|---|
| 3 | |
| 4 | |
| 5 | |
| 6 | |
| 7 | |
| 8 | |

TABLE 2-continued
| No. | Cationic Structures |
|---|---|
| 9 | 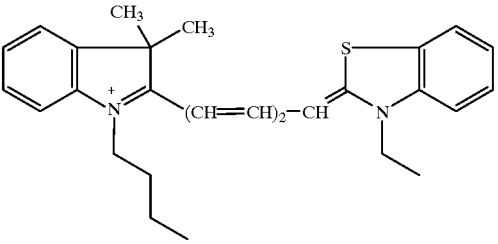 |
| 10 | 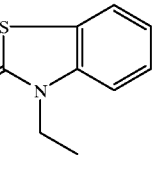 |
| 11 | 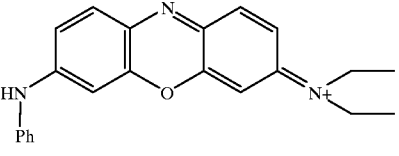 |
| 12 | 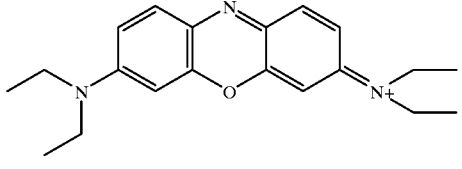 |
| 13 | 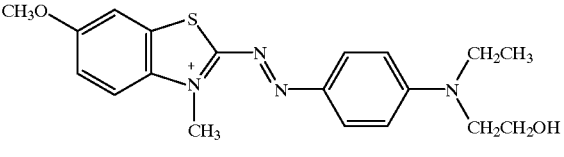 |
| 14 | 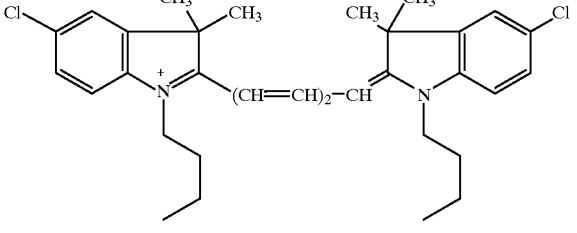 |
| 15 | 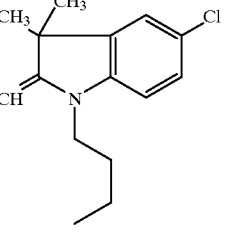 |

Exemplary tetra dyes formed from the components of Table 1 and Table 2 are presented in Table 3:

TABLE 3

[Anionic Ni Azo Structure]$^{2-}$ 2[Cationic Structure]$^+$

| Tetra Dyes | dianionic Structures from Table 1 | Cationic Structure from Table 2 | N/k at* 780 nm |
|---|---|---|---|
| A1 | C | 1 | 2.4/0.04 |
| A2 | H | 2 | 2.5/0.02 |
| A3 | C | 2 | 2.4/0.05 |
| A4 | D | 5 | 2.5/0.06 |
| A5 | C | 3 | 2.4/0.06 |
| A6 | C | 9 | 2.7/0.14 |
| A7 | C | 4 | 2.6/0.11 |
| A8 | E | 12 | 2.4/0.10 |
| A9 | F | 2 | 2.4/0.03 |
| A10 | D | 2 | 2.4/0.05 |
| A11 | E | 10 | 2.6/0.14 |

*Real and Imaginary Indexes are given as measured by a Variable Angle Spectroscopic Ellipsometer (VASE) manufactured by G. A. Woollam Company

OPTICAL RECORDING ELEMENTS

The optical elements of the invention comprise a light transmitting, typically pregrooved substrate, a light absorptive layer comprising a dye of the invention overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (n) of the unwritten light absorptive layer measured with a 780 nm light source is not less than 1.8 and the imaginary part (k) is not greater than 0.15.

The substrate may be any transparent material that satisfies the mechanical and optical requirements. The substrates are generally pregrooved with groove depths from 20 to 250 nm, groove widths 0.2 to 1 μm and a pitch 0.5 to 2 μm. The preferred material is polycarbonate, other materials are glass, polymethylmethacrylate and other suitable polymeric materials.

The preparation of the optical recording element of the invention is achieved by spin coating a tetra dye or a tetra dye mixture, or such compositions with additional dyes, or with addenda from a suitable solvent onto a transparent substrate. For coating, the dye mixture with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halogens, cellosolves, ketones. Examples of solvents are methanol, ethanol, propanol, pentanol, 2,2,3,3-tetrafluoropropanol, tetrachloroethane, dichloromethane, methyl cellosolve, ethyl cellosolve, 1-methoxy-2-propanol, methyl ethyl ketone, 4-hydroxy-4-methyl-2-pentanone. Preferred solvents are alcohols since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates.

One preferred protective layer is disclosed in U.S. Pat. No. 5,312,663 in the names of Kosinski and Amell. This patent discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

EXAMPLES

Representative metallized dyes from Table 3 were used to form optical recording layers and optical recording elements.

The following examples demonstrate the optical recording capability of the recording layer mixtures used in the elements of this invention.

EXAMPLE 1

A polycarbonate substrate having a thickness of 1.2 mm, an outer diameter of 120 mm and an inner diameter of 15 mm and having a spiral pregroove formed on its surface with a width of 490 nm, and a depth of 205 nm and a pitch of 1.6 μm, was made by injection molding.

To form the light absorptive layer 5 parts by weight Tetra dye A10 (Table 3) was dissolved in 100 parts by volume of a mixture of 1-methoxy-2-propanol and diacetone alcohol in 97 to 3 ratio, with stirring at room temperature for 1 hour. The solution was filtered through a 0.2 μm filter. Then the solution was coated on the surface of the substrate by spin coating with a Headway Research Coater (Model No. CB 15/PWM 101) to an optical density of 1.90 at 671 nm. It was dried at 800° C for 15 minutes and at 600° C for 6 hours.

Then a gold reflective layer was deposited on the dye side over the entire surface of the element by a DC magnetron sputtering process to about 65 nm thickness.

A protective lacquer layer (Daicure SD-17™ from Dainippon Ink and Chemical Co.) was applied by spin coating onto the gold layer to a thickness of 7 to 11 μm and it was UV cured with an 'H' bulb using a Fusion System cure at 3000 W/inch power for 15 seconds.

The optical element was tested in the following manner. A test system consisting of an optical head with a 788 nm laser, a 0.5 NA lens, phase tracking, and half-aperture focusing was used. Recording and play back were carried out with the same laser at 2.4 m/s rotational speed. The read power was kept at 0.6 mW. A single frequency was recorded with about 3.5 micron mark and land length at 9 mW write power, through a 30 Kz filter, forming marks of lower reflectivity. When the marks were read the CNR (Alan B. Marchant, *Optical Recording*; Addison-Wesley Publishing Company, 1990, pg. 397) was 61 dB.

EXAMPLES 2 THROUGH 11

For Examples 2 through 11, the same solvent composition, same substrate dimensions, filter, spin coater, drying conditions, gold deposition process, lacquer layer application and testing procedure was used as in the first example. The composition of the dye mixture, the dye mixture to solvent ratio, and the optical density of the dye coatings are given in Table 4.

EXAMPLES 12 THROUGH 16

Examples 12 through 16 were prepared as in Example 1, except 2,2,3,3-tetrafluoropropanol was used as the solvent, the dye was spin coated on an ungrooved substrate, the coating was dried at 60° C. for 10 minutes, and the gold reflective layer was deposited by thermal evaporation.

In Table 4 it can be observed that the all of the coatings above 200 nm thickness were very sensitive to laser recording.

TABLE 4

| Example | Tetra Dye No. 1 from Table 3 | Tetra Dye No. 2 from Table 3 | Parts Solid/100 Parts Solvent | Ratio Dyes | Dye Layer Thickness nm | Optical Density 671 nm | CNR 9 mW (dB) |
|---|---|---|---|---|---|---|---|
| 1 | A10 | | 5 | | 257 | 1.90 | 61 |
| 2 | A4 | 5 | 5 | | 281 | 1.96 | 62 |
| 3 | A5 | | 5 | | 285 | 2.11 | 64 |
| 4 | A1 | | 5 | | 290 | 2.01 | 61 |
| 5 | A2 | | 5 | | 256 | 2.10 | 58 |
| 6 | A9 | | 5 | | 263 | 2.18 | 59 |
| 7 | A3 | A10 | 6 | 1/1 | 263 | 1.99 | 65 |
| 8 | A2 | A10 | 5 | 1/1 | 290 | 2.30 | 63 |
| 9 | A3 | A10 | 6 | 1/2 | 272 | 2.03 | 66 |
| 10 | A4 | A10 | 6 | 1/1 | 295 | 2.13 | 64 |
| 11 | A3 | A10 | 1.5 | 1/2 | 166 | 0.89 | 57 |
| 12 | A3 | | 2.5 | | 132 | 1.56 | 40 |
| 13 | A3 | | 5 | | 176 | 2.04 | 44 |
| 14 | A3 | | 5 | | 216 | 2.53 | 53 |
| 15 | A3 | | 5 | | 258 | 2.98 | 62 |
| 16 | A3 | | 5 | | 292 | 2.92 | 61 |
| 17 | A10 | | 2.5 | | 168 | 0.96 | 56 |

COMPARATIVE EXAMPLE 1

Example 1 was repeated as above except that a 97/3 mixture of 1-methoxy-2-propanol and 3-chloro-1-propanol was used as the coating solvent and the dye layer was coated much thinner to an optical density of 0.96. When elements from Example 1 and Comparative Example 1 were compared by writing a power series, at the lower powers (4–10 mW) the thicker layers give the same CNR value at 2 mW less power than the thinner layer (FIG. 1).

COMPARATIVE EXAMPLE 2

Figure 2:
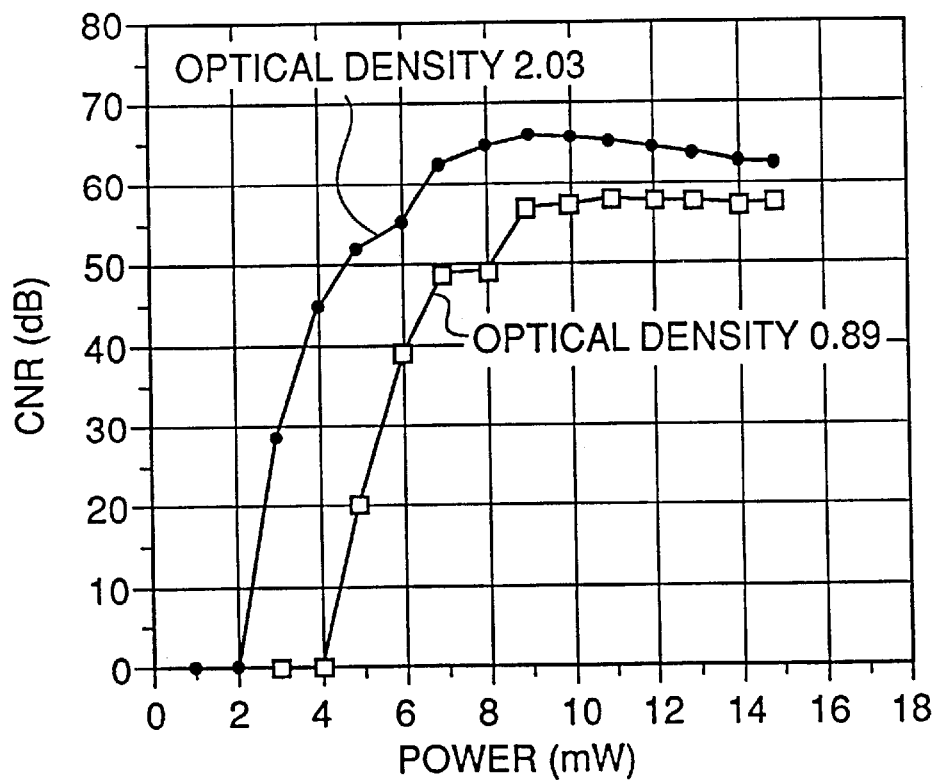

Coatings from Examples 9 and 11 with optical densities of 2.03 and 0.89, respectively, at 671 nm were compared by writing a power series on each element. A greater than 2 mW sensitivity difference in favor of the higher optical density (thicker) coating served (FIG. 2).

The invention has been described in detail with particular reference to a preferred embodiment thereof. However it will be understood that variations and modifications can be effected within the spirit and scope of the invention as described hereinabove and defined in the appended claims.

We claim:

1. An optical recording element having a transparent substrate and on the surface of said substrate, a recording layer and a light reflecting layer wherein (a) the unrecorded layer is such that the real part of the refractive index (n) at 780 nm, is not less than 1.8, and the imaginary part (k) is not greater than 0.15 and (b) the recording layer comprises one or more tetra dyes having a metallized azo dianionic dye with cationic dye counterions and (c) the recording layer thickness from 225 to 300 nanometers.

2. The optical recording element of claim 1 wherein the tetra dye has the structure (I):

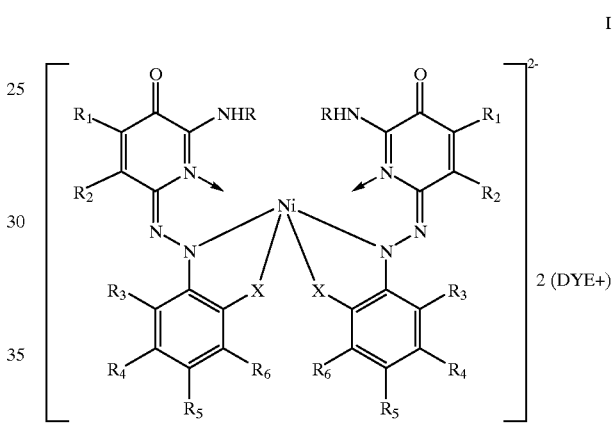

R represents hydrogen, alkyl having 1 to 20 carbons, aryl having 6 to 10 carbon atoms;

$R_1$ represents hydrogen or alkyl having 1 to 6 carbon atoms;

$R_2$ represents a hydrogen, alkyl having 1 to 5 carbon atoms, $SO_2R_7$ or $SO_2NHR_7$ where $R_7$ is alkyl having 1 to 10 carbon atoms, aryl having 6 to 10 carbon atoms hetaryl having 5 to 10 carbon atoms or halogen;

$R_3$ represents hydrogen, alkyl having 1 to 4 carbon atoms or halogen;

$R_4$ represents hydrogen, halogen, alkyl having 1 to 10 carbons, $SO_2R_7$ or $SO_2NHR_7$;

$R_5$ represents an electron withdrawing group such as CN, $SO_2R_8$, $SO_2NR_9R_{10}$ where $R_8$, $R_9$ or $R_{10}$ each independently represents hydrogen, alkyl group from 1 to 5 carbons; aryl having 6 to 10 carbon atoms; hetaryl, having 5 to 10 carbon atoms, cycloalkyl having 5 to 7 carbons;

$R_6$ represents hydrogen; alkyl having 1 to 5 carbons or halogen;

X represents oxygen, carboxyl or sulfo; and

Dye+ can be any dye that has one or more positive charges.

3. The optical recording element of claim 2 wherein the tetra dye has a structure according to the following Table 1 and the cationic dye counterion has a structure selected from Table 2:

TABLE 1
[Anionic Ni Azo Structure]$^{2-}$
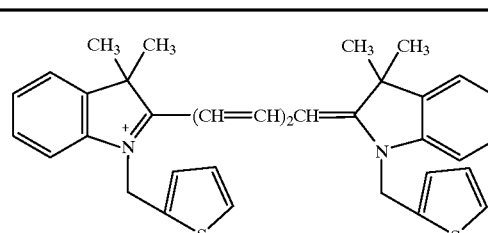
| Dianion Ni Complex | R | $R_1$ | $R_2$ | $R_3$ | $R_4$ | $R_5$ | $R_6$ | X |
|---|---|---|---|---|---|---|---|---|
| A | H | H | H | H | Cl | $CH_3SO_2$ | H | O |
| B | H | H | Br | H | H | $CH_3SO_2$ | H | O |
| C | H | H | $CH_3SO_2$ | H | Cl | $CH_3SO_2$ | H | O |
| D | H | H | $CH_3SO_2$ | H | Cl | $(CH_3)_3CHNSO_2$ | H | O |
| E | H | $CH_3$ | $CH_3SO_2$ | H | Cl | $CH_3SO_2$ | H | O |
| F | H | $CH_3$ | $CH_3SO_2$ | H | H | $NO_2$ | H | $SO_3$ |
| G | H | H | $CH_3SO_2$ | H | H | $CH_3SO_2$ | H | O |
| H | H | H | H | H | H | $CH_3SO_2$ | H | O |
TABLE 2
Cationic Structures
| No. | Cationic Structures |
|---|---|
| 1 | 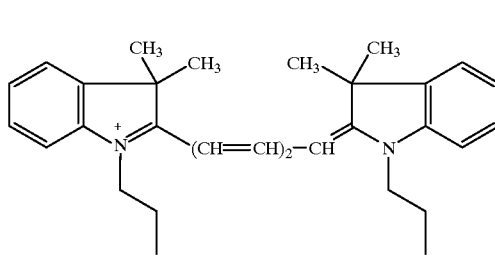 |
| 2 | |

TABLE 2-continued
| No. | Cationic Structures |
|---|---|
| 3 | 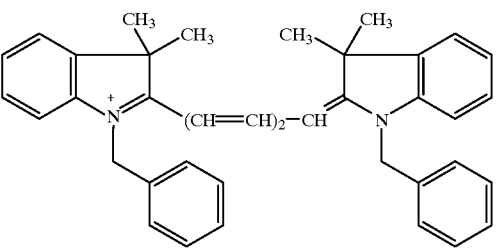 |
| 4 | 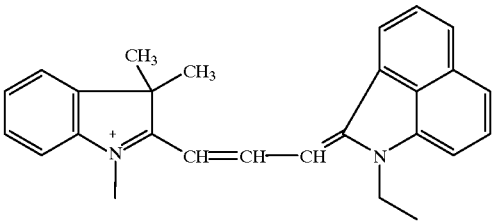 |
| 5 | 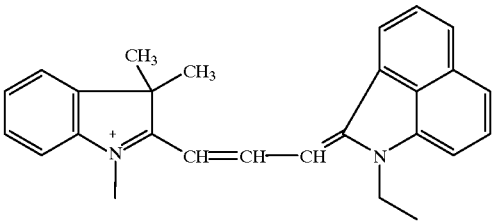 |
| 6 | 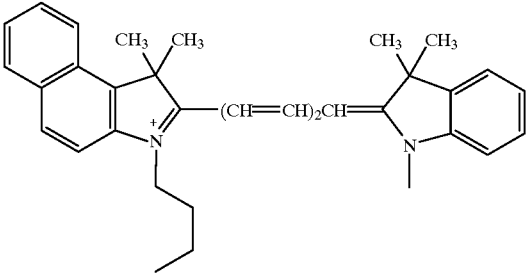 |
| 7 | 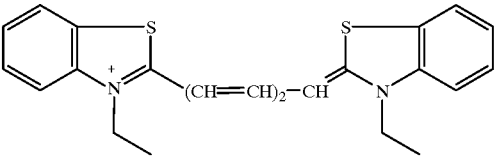 |

TABLE 2-continued

| | Cationic Structures |
|---|---|
| No. | Cationic Structures |
| 8 | (structure) |
| 9 | (structure) |
| 10 | (structure) |
| 11 | (structure) |
| 12 | (structure) |
| 13 | (structure) |
| 14 | (structure) |

TABLE 2-continued

Cationic Structures

| No. | Cationic Structures |
|---|---|
| 15 | CH₃O-[indole with CH₃, CH₃ groups, N⁺-CH₃]-(CH=CH)₂-CH=[indole with CH₃, CH₃, N-CH₃]-OCH₃ |

4. The optical recording element of claim 3 wherein the tetra dye has a structure according to Table 3:

TABLE 3

[Anionic Ni Azo Structure]²⁻ 2[Cationic Structure]⁺

| Tetra Dyes | dianionic formazan Structures from Table 1 | Cationic Structure from Table 2 |
|---|---|---|
| A1 | C | 1 |
| A2 | H | 2 |
| A3 | C | 2 |
| A4 | D | 5 |
| A5 | C | 3 |
| A6 | C | 9 |
| A7 | C | 4 |
| A8 | E | 12 |
| A9 | F | 2 |
| A10 | D | 2 |
| A11 | E | 10 |

* * * * *